(12) United States Patent
Hannemann et al.

(10) Patent No.: US 10,040,014 B2
(45) Date of Patent: Aug. 7, 2018

(54) ANNULAR GAS FEED ELEMENT FOR USE IN GASIFICATION PLANTS WITH A DRY FUEL SUPPLY

(71) Applicant: Siemens Aktiengesellschaft, Munich (DE)

(72) Inventors: Frank Hannemann, Freiberg (DE); Sebastian Rahm, Dresden (DE); Marcus Weder, Bannewitz OT Hänichen (DE)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 15/216,659

(22) Filed: Jul. 21, 2016

(65) Prior Publication Data

US 2017/0028334 A1 Feb. 2, 2017

(30) Foreign Application Priority Data

Jul. 30, 2015 (DE) .......................... 10 2015 214 497

(51) Int. Cl.
| | |
|---|---|
| *B01D 46/00* | (2006.01) |
| *B01D 39/20* | (2006.01) |
| *B01D 39/12* | (2006.01) |
| *B01D 46/24* | (2006.01) |
| *B01D 46/10* | (2006.01) |

(52) U.S. Cl.
CPC .......... *B01D 46/106* (2013.01); *B01D 39/12* (2013.01); *B01D 39/2027* (2013.01); *B01D 39/2044* (2013.01); *B01D 46/0002* (2013.01); *B01D 46/24* (2013.01); *B01D 2265/06* (2013.01)

(58) Field of Classification Search
CPC .... C10J 3/30; C10J 2200/15; C10J 2200/152; B65G 3/18; B65G 3/26
USPC ..................................................... 406/171, 191
See application file for complete search history.

(56) References Cited

U.S. PATENT DOCUMENTS

| | | | | | |
|---|---|---|---|---|---|
| 4,116,491 | A | * | 9/1978 | Ply ........................ | B65G 53/521 406/122 |
| 4,775,267 | A | * | 10/1988 | Yamamoto ........... | B65G 53/525 406/12 |
| 4,830,545 | A | * | 5/1989 | Salter ......................... | B01J 3/02 406/12 |
| 5,722,802 | A | * | 3/1998 | March ................... | B05B 7/1404 134/102.2 |

(Continued)

FOREIGN PATENT DOCUMENTS

WO 2006064014 A1 6/2006

*Primary Examiner* — Matthew J Merkling
(74) *Attorney, Agent, or Firm* — Beusse Wolter Sanks & Maire

(57) ABSTRACT

An annular gas feed element for use in gasification plants with a dry fuel supply. A gas feed ring element for tensioning and fluidizing gas/solid suspensions, in which gas feed ring element there is a housing ring which has a circumferential recess on its inner side, a support ring with a multiplicity of openings, filter material fitted between the support ring and the internal diameter of the housing ring, where the recess and the filter material delimit a distributor chamber, and a gas feed arranged from outside into the distributor chamber. The flangeless gas feed ring element makes rapid tensioning possible and secondly improves the fluidizing behavior and therefore the flow behavior.

14 Claims, 3 Drawing Sheets

(56) References Cited

U.S. PATENT DOCUMENTS

| | | | | |
|---|---|---|---|---|
| 6,227,768 | B1* | 5/2001 | Higuchi | B65G 53/521 |
| | | | | 138/114 |
| 6,719,500 | B2* | 4/2004 | Pfeiffer | B65G 53/18 |
| | | | | 406/91 |
| 7,857,553 | B2* | 12/2010 | Tsuchie | F16L 9/18 |
| | | | | 138/104 |
| 8,579,212 | B2* | 11/2013 | Schilder | C10J 3/485 |
| | | | | 239/461 |
| 9,488,316 | B2* | 11/2016 | Wu | F17D 1/17 |
| 2007/0183854 | A1* | 8/2007 | Sonnichsen | B65G 53/18 |
| | | | | 406/123 |
| 2008/0031697 | A1* | 2/2008 | Berggren | B65G 53/52 |
| | | | | 406/89 |

* cited by examiner

ANNULAR GAS FEED ELEMENT FOR USE IN GASIFICATION PLANTS WITH A DRY FUEL SUPPLY

CROSS REFERENCE TO RELATED APPLICATIONS

This application claims the benefit of German Application No. DE 102015214497.6 filed 30 Jul. 2015, incorporated by reference herein in its entirety.

FIELD OF INVENTION

The invention relates to a gas feed ring element for tensioning and fluidizing gas/solid suspensions.

BACKGROUND OF INVENTION

In entrained flow gasification, the input material to be gasified, such as coal dust, is stored in what is known as the supply system, is tensioned to the required operating pressure of between 2.5 MPa and 8 MPa and is fed to the burner via delivery lines. Here, the rapid pressure increase of the fuel dust to operating pressure in what is known as the lock container represents a special problem. The pressure increase takes place by way of the addition of $N_2$ or $CO_2$ as tensioning medium. Said tensioning operation can lead to solidification of the fuel dust bed if the tensioning medium is fed in exclusively from the top of the lock. A solidification of this type is to be avoided if possible for disruption-free discharge of the fuel dust.

In order to avoid a solidification of the fuel dust bed in the lock as a result of the tensioning operation, a part flow of the gas which is required for the tensioning operation can be fed in in the discharge region of the container. Discharging aids, as are used as standard in silo technology in the form of, for example, aeration pads or vibration pads, are unsuitable for this purpose. Said elements are designed for non-pressurized environments and are not subjected to any relatively great alternating pressure and/or temperature stresses.

The prior art is a fluidizing element, as described in document WO 2006/064014 A1. This solution has the disadvantage that said element is complicated to manufacture, consists of a plurality of individual parts and leads to higher weights on account of a double flange connection with a relatively large diameter, and is difficult to handle for assembly at the building site. Furthermore, there is the disadvantage that the spacing between the isolation valve and the lock outlet and between the isolation valve and the fluidizing area is correspondingly increased on account of the design and therefore the supply system is of higher overall design, but there is also the risk of a solidification of the dust between the isolation valve and the fluidizing area. In addition, it has been shown in practice that relatively high speeds and differential pressures which result therefrom over the fluidizing area are necessary. They cannot be achieved by way of the solution which is described in WO 2006/064014 because the mechanical stability cannot be achieved solely by way of the filter material.

SUMMARY OF INVENTION

The invention is based on the problem of providing an apparatus for tensioning and fluidizing gas/solid suspensions, which apparatus firstly makes rapid tensioning possible and secondly improves the fluidizing behavior and therefore the flow behavior.

The problem is solved by way of a gas feed ring element having the features of the independent claim.

The fluidizing element according to the invention (fluidizing ring) can ensure a compact and inexpensive feed of fluidizing and tensioning gas, without a compression of the coal above the isolation valve 3 in the figure needing to be feared. Here, the gas speeds can be selected to be very high, without the filter material being destroyed mechanically. The mechanical stability is ensured via the additional support ring 7. Here, the openings within the support ring can be of different configuration. Possible solutions are, for example, bores, slots or triangles. Furthermore, said openings can also be configured at different angles, in order thus to ensure an optimum distribution of the gas. Here, the feed of the gas to the filter material 6 and support ring 7 takes place via a machined-out distributor space 5.

The compact design is produced via a fluidizing ring which is clamped into a flange connection, a double flange connection no longer being necessary. On account of the short design, smaller length extents and stresses are produced which can be absorbed by way of the support ring 7 without expansion joints. Said stresses are also lower because the flange connection, support ring, screw connection and housing ring consist of a similar material and not of a different material, as in WO 2006/064014. For example, the filter material which has to absorb the stresses in WO 2006/064014 usually consists of stainless steel or sinter bronze. The overall height and the material requirement can be reduced with simultaneous improvement of the fluidizing behavior by way of the fluidizing ring being clamped into the existing flange connection of the isolation valve and the lock. The sealing action within the flange connection can be brought about by way of commercially available seal systems.

The speed and therefore penetration depth and the fluidizing behavior into the bed can be optimized via the number and the configuration of the openings.

The gas feed 10 can be of different configuration for an optimized flow in the distributor space 5, as a result of which possibly additional mechanical elements, such as the baffle plate 11, can be dispensed with.

The gas feed ring element according to the invention is advantageously of flangeless configuration.

Advantageous developments of the invention are specified in the subclaims.

BRIEF DESCRIPTION OF THE DRAWINGS

In the following text, the invention is explained in greater detail as an exemplary embodiment to an extent which is required for comprehension using figures, in which.

DETAILED DESCRIPTION OF INVENTION

Figure 1:
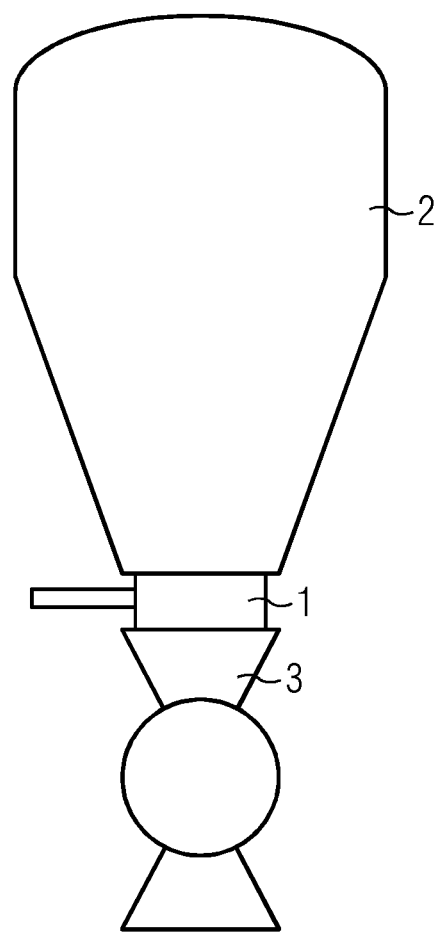
FIG. 1 shows an arrangement of the fluidizing ring as part of a lock container.
Figure 2:
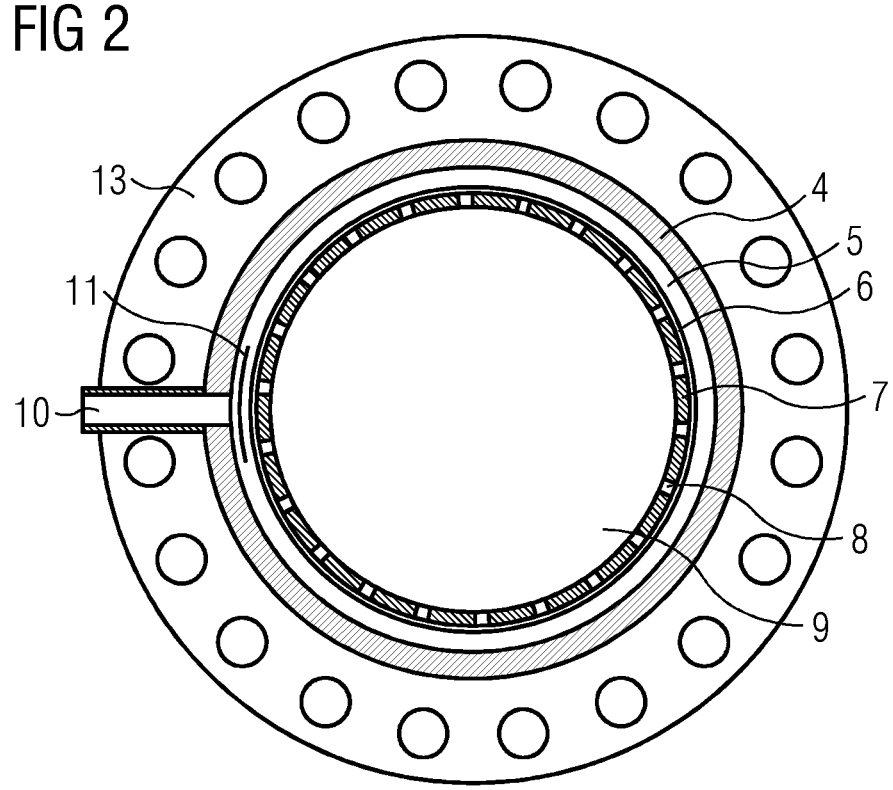
FIG. 2 shows an exemplary installation of the fluidizing ring into a flange connection.
Figure 2:
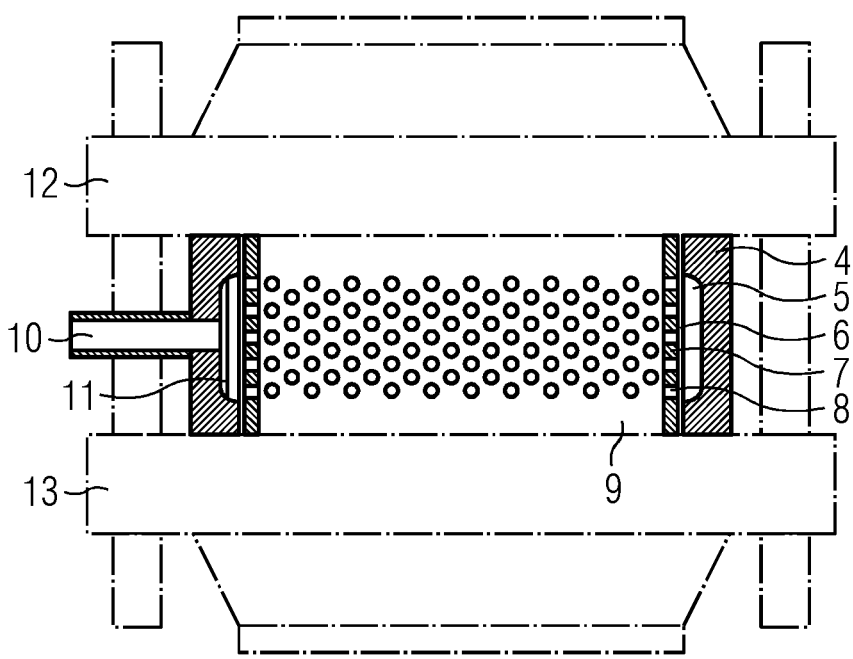
Figure 3:
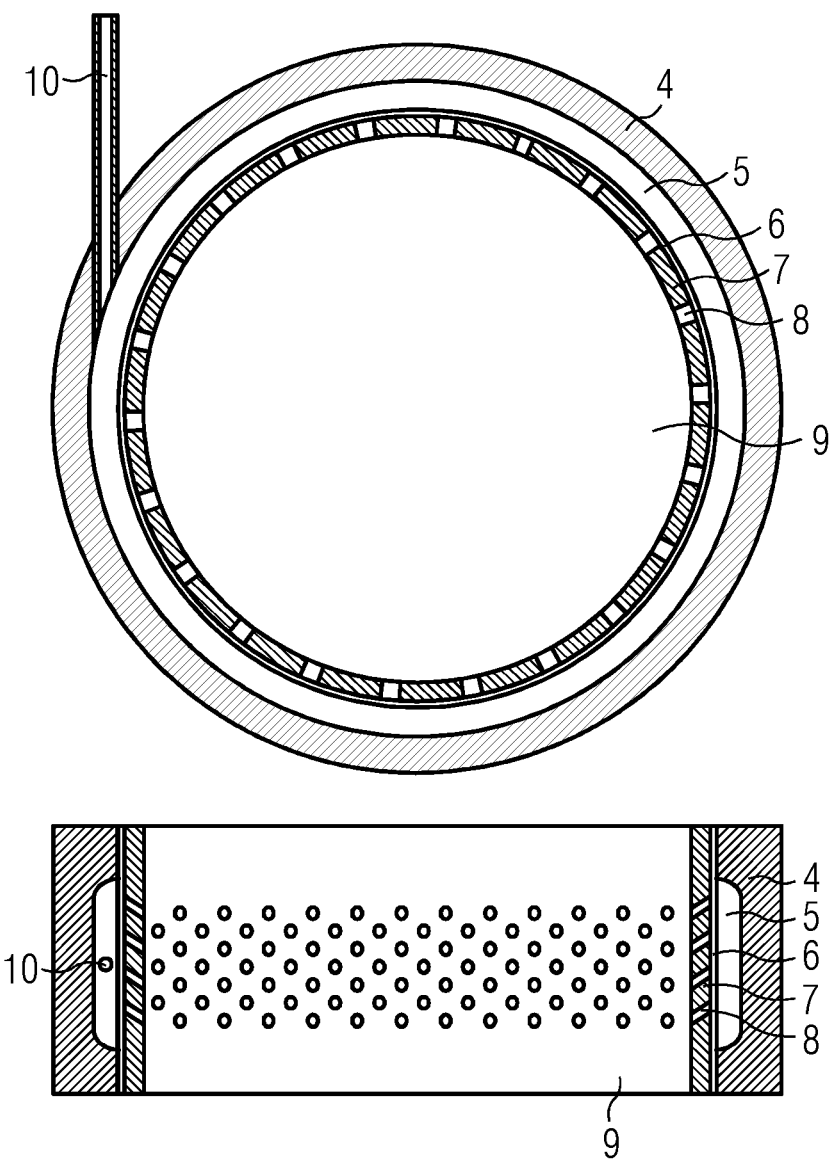
FIG. 3 shows a fluidizing ring with a tangential gas feed and inclined openings.

Identical designations denote identical elements in the figures.

The gas feed ring element according to the invention for tensioning and fluidizing gas/solid suspensions is configured as a ring and does not have a dedicated flange connection.

The gas feed ring element has one or more gas feeds 10, the gas being distributed to a filter material 6 via a distributor ring 5 which is machined from the housing ring 4.

One or more baffle plates 11 can be arranged in the distributor ring 5.

The filter material 6 is pulled on the outside onto a support ring 7 with openings, the support ring and the filter material being arranged in a housing ring 4.

The housing ring 4 can be shrink-fitted onto the support ring 7 together with the filter material 6.

The housing ring 4 can be welded to the support ring 7 together with the filter material 6.

The filter material 6 can consist of metal fabric, sintered metal, or of porous metal.

The gas feed 10 can take place radially into the distributor space.

The gas feed 10 can take place tangentially into the distributor space.

The openings in the support ring 7 can be configured as bores or as slots.

The openings in the support ring 7 can be inclined.

The gas feed ring element can be arranged below a lock of a coal gasification plant at tensioning pressures of between 2.5 and 8 MPa.

The gas feed ring element can be arranged between the flange of the lock 2 and the flange of an isolation valve 3.

In one embodiment which is adapted with regard to the dimensions, the gas feed ring element can be inserted into pneumatic delivery lines for adding gas for flushing or improving the delivery.

The gas feed ring element can be integrated into a pneumatic delivery line.

The present invention has been explained in detail using specific exemplary embodiments for illustration purposes. Here, elements of the individual exemplary embodiments can also be combined with one another. The invention is therefore not intended to be limited to individual exemplary embodiments, but rather merely be restricted by way of the appended claims.

LIST OF DESIGNATIONS

1. Fluidizing ring, gas feed ring element
2. Lock
3. Isolation valve
4. Housing ring
5. Recess: housing ring, distributor space, annular chamber
6. Filter material
7. Support ring
8. Openings in the support ring
9. Dust space
10. Gas feed
11. Baffle plate
12. Lock flange
13. Ball valve flange, isolation valve flange

The invention claimed is:

1. A gas feed ring element for tensioning and fluidizing gas/solid suspensions, wherein the gas feed ring element comprises:
   a housing ring which comprises a circumferential recess on its inner side,
   a support ring comprising a multiplicity of openings,
   filter material fitted between the support ring and an internal diameter of the housing ring,
   wherein the circumferential recess and the filter material delimit a distributor chamber that defines an annular volume, and
   a gas feed arranged from outside into the distributor chamber,
   wherein the gas feed opens tangentially into the annular volume of the distributor chamber.

2. The gas feed ring element as claimed in claim 1, further comprising:
   a baffle plate arranged in the distributor chamber in an inlet region of the gas feed.

3. The gas feed ring element as claimed in claim 1, wherein the multiplicity of openings are arranged at an angle with respect to a surface of the support ring, which angle differs from the perpendicular.

4. The gas feed ring element as claimed in claim 1, wherein the multiplicity of openings comprise different angles among one another.

5. The gas feed ring element as claimed in claim 1, wherein the gas feed is arranged at an angle with respect to a surface of the support ring, which angle differs from perpendicular.

6. The gas feed ring element as claimed in claim 1, wherein the filter material is formed with metal fabric.

7. The gas feed ring element as claimed in claim 1, wherein the filter material is formed with sintered metal.

8. The gas feed ring element as claimed in claim 1, wherein the filter material is formed with porous metal.

9. The gas feed ring element as claimed in claim 1, wherein the housing ring, the filter material and the support ring are welded to form a unit.

10. The gas feed ring element as claimed in claim 1, wherein the housing ring is shrink-fitted onto the support ring together with the filter material.

11. The gas feed ring element as claimed in claim 1, wherein the gas feed ring element is devoid of a connector flange.

12. The gas feed ring element as claimed in claim 1, wherein a solid is provided by combustible dust, and the gas feed ring element is arranged at the bottom of a lock for feeding in the combustible dust at a tensioning pressure of between 2.5 and 8 MPa.

13. The gas feed ring element as claimed in claim 1, wherein the gas feed ring element is arranged between a flange of a lock and a flange of an isolation valve.

14. The gas feed ring element as claimed in claim 1, wherein the gas feed ring element is inserted into a pneumatic delivery line.

* * * * *